US005777411A

United States Patent [19]
Nakajima et al.

[11] Patent Number: 5,777,411
[45] Date of Patent: Jul. 7, 1998

[54] GEARED ELECTRIC MOTOR

[75] Inventors: Fumio Nakajima; Takeo Furuya; Sumio Furukawa; Toshihiro Negishi, all of Yokohama, Japan

[73] Assignee: Jidosha Denki Kogyo Kabushiki Kaisha, Yokohama, Japan

[21] Appl. No.: 609,907

[22] Filed: Feb. 29, 1996

[30] Foreign Application Priority Data

Mar. 1, 1995 [JP] Japan ................................. 7-042117

[51] Int. Cl.$^6$ ................................................. H02K 7/10
[52] U.S. Cl. ........................... 310/83; 310/75 D; 310/80; 310/97; 310/99; 310/92; 74/425
[58] Field of Search ........................ 310/83, 75 D, 310/80, 97, 99, 92; 74/425

[56] References Cited

U.S. PATENT DOCUMENTS

| | | | |
|---|---|---|---|
| 4,652,781 | 3/1987 | Andrei-Alexandru et al. | 310/83 |
| 4,790,202 | 12/1988 | Hayashi et al. | 74/396 |
| 4,993,277 | 2/1991 | Adam et al. | 74/425 |
| 5,212,999 | 5/1993 | Kitada | 74/425 |
| 5,325,736 | 7/1994 | Tsujita | 74/425 |

FOREIGN PATENT DOCUMENTS 1227010  6/1968  Germany ................ 310/83

*Primary Examiner*—Steven L. Stephan
*Assistant Examiner*—K. Imayoshi Tamai
*Attorney, Agent, or Firm*—Sughrue, Mion, Zinn, Macpeak & Seas, PLLC

[57] ABSTRACT

A geared electric motor 1 used for power window apparatuses, for example, which is provided with an mature 7 having an armature shaft 7a, an output shaft 8 connected with the armature shaft 7a through a worm gear pair (7a7 and 17) and two friction plates 9 and 10 to be in contact with both end faces of the armature shaft 7a. The armature shaft 7a of this motor 1 is prevented from rotation by frictional resistance generating between the friction plates 9, 10 and the armature shaft 7a even if the output shaft 8 is applied with rotatory force.

1 Claim, 5 Drawing Sheets

GEARED ELECTRIC MOTOR

BACKGROUND OF THE INVENTION

1. Field of the Invention

This invention relates to an geared electric motor used for actuating window glasses or roof lids in motor vehicles, for example.

2. Description of the Prior Art

Heretofore, as a geared electric motor for actuating window glasses in motor vehicles, for example, there has been known an electric motor which is provided with a motor yoke forming a part of a case and secured with magnets on the inner surface of the motor yoke, and an armature disposed rotatably on the inside of the magnets. The armature is provided with a worm formed on an armature shaft, and the worm is meshed with a worm wheel secured with an output shaft. The output shaft of the electric motor is further connected mechanically with a window glass through a window regulator of the power window apparatus.

The armature receives a force in the magnetic field of the magnets and rotates by applying an electric current to the armature, and the motor actuates the window glass in the upward or downward direction through the output shaft and the window regulator.

In the aforementioned electric motor, the armature shaft is provided with two steel balls fitted into holes bored in the respective end faces of the armature shaft so that the armature shaft may be pressed against steel-made thrust plates disposed in the case of the motor through the steel balls when the armature shaft is applied with thrust load.

In the power window apparatus of this kind, it is preferable in view of prevention of a burglary that the window glass may be hot moved even if the window glass receives external force in the opening direction of the window. Therefore, the geared electric motor for the power window apparatus is desirable to be designed so that the rotation of the output shaft may be not transmitted to the armature shaft through the worm gear pair even if the output shaft is applied with rotatory force.

It is possible to make the armature shaft of the geared motor so as not to be transmitted with the rotatory force of the output shaft by making a lead angle of the worm gear pair lower than a certain value (approximately 5 degrees, for example). However, it is difficult to procedure the worm with such the low lead angle through the rolling process, therefore there is a problem in that it is not possible to improve the productivity and there is no room for reducing the production cost of the worm.

It is also possible to prevent the rotation of the armature shaft at the time of applying the rotatory force to the output shaft by utilizing deflection of the armature shaft. Namely, when the rotatory force of the output shaft is applied to the armature shaft of the geared motor through the worm wheel and the worm, the armature shaft given with appropriate flexibility deflects. Accordingly, the armature shaft is pressed against a bearing, thereby increasing friction between the armature shaft and the bearing which supports the armature shaft rotatably, and preventing the rotation of the armature shaft.

In the geared motor of this kind, however, there is a problem in that the worm wheel is easy to break because the worm wheel becomes improper to be meshed with the worms owing to the deflection of the armature shaft. Further, there is another, problem in that it is not possible to reliably prevent the rotation of the armature shaft caused by the rotation of the output shaft for a long time owing to wear in the bearing and the armature shaft.

SUMMARY OF THE INVENTION

This invention is made in order to solve the aforementioned problems of the prior art, and it is an object to provide a geared electric motor which is possible to reduce its cost and possible to prevent the irregular rotation, that is the rotation of the armature shaft caused by the rotation of the output shaft, reliably for a long time.

Therefore, the geared electric motor according to this invention for attaining the aforementioned object is characterized by comprising a case provided with a magnet secured on an inner peripheral face thereof, an armature disposed on an inner side of the magnet and provided with an armature shaft supported rotatably by the case, an output shaft connected with the armature shaft through a worm gear pair, and a friction plate disposed between the case and an end face of the armature shaft and being in contact with the end face of the armature shaft of the armature.

In the geared electric motor according to the first or second embodiment of this invention, the armature shaft of the armature may be formed with a concavity to be out of contact with the friction plate in the center of the end face thereof, or may be further formed with a bevel edge to be out of contact with the friction plate at an outer periphery of the end face thereof in addition to the above-mentioned concavity. In the geared electric motor according to the third or fourth embodiment of this invention, the friction plate may be formed with a concavity to be out of contact with the end face of the armature shaft in the center of a contacting surface thereof, or may be further formed with a recession to be out of contact with the end face of the armature shaft at an outer periphery of a contacting surface thereof in addition to the above-mentioned concavity.

Further in the geared electric motor according to the fifth embodiment of this invention, the friction plate may be disposed between the case and the face of the armature shaft together with a backing plate.

In the geared electric motors according to the sixth and seventh embodiments of this invention, the armature shaft of the armature is preferable to be supported rotatably at both ends thereof through a first and a second bearing disposed in the case, and further preferable to be further supported at the middle portion thereof through a third bearing disposed in the case in addition to the first and second bearings.

Accordingly, in the geared electric motor according to this invention, the irregular rotation of the armature shaft is prevented reliably even if the rotatory force is applied on the output shaft of this motor because frictional force is generated between the end face of the armature shaft and the friction plate disposed in the case of the motor.

As the first or second embodiment of this invention, in the geared electric motor of which armature shaft is formed with the concavity or both of the concavity and the bevel edge at its end face, the frictional force generated between the friction plate and the end face of the armature shaft is controlled according to requirement, especially so as to be increased because the friction plate comes in touch with the end face of the armature shaft at the peripheral part away from the center of the end face, and the force applied on the unit area of the friction plate becomes larger, thereby increasing the true (not apparent) contacting area between the friction plate and the end face of the armature shaft. Also in the geared electric motor according to the third or fourth embodiment, which is provided with the friction plate formed with the concavity or both of the concavity and the recession on its contacting surface, the frictional force generated between the friction plate and the end face of the armature shaft is regulated especially so as to be increased for the reason similar to the above.

In the geared electric motor according to the fifth embodiment of this invention, the friction plate is reinforced by the backing plate disposed in the case together with the friction plate.

Furthermore, in the geared electric motor according to the sixth embodiment of this invention, the armature shaft is supported rotatably in stable by the first and second bearings at the both ends thereof. In the geared electric motor according to the seventh embodiment, the worm and the worm wheel are prevented from breakage even when excessive load exceeding the rated capacity is applied on the output shaft of the motor, because the armature shaft is supported by the third bearing at the middle portion in addition to the first and second bearings which support rotatably the shaft at the both ends, whereby the armature shaft is prevented from the excessive deflection at the time when the armature shaft receive the excessive force from the output shaft through the worm wheel.

DESCRIPTION OF THE PREFERRED EMBODIMENT

Figure 1:
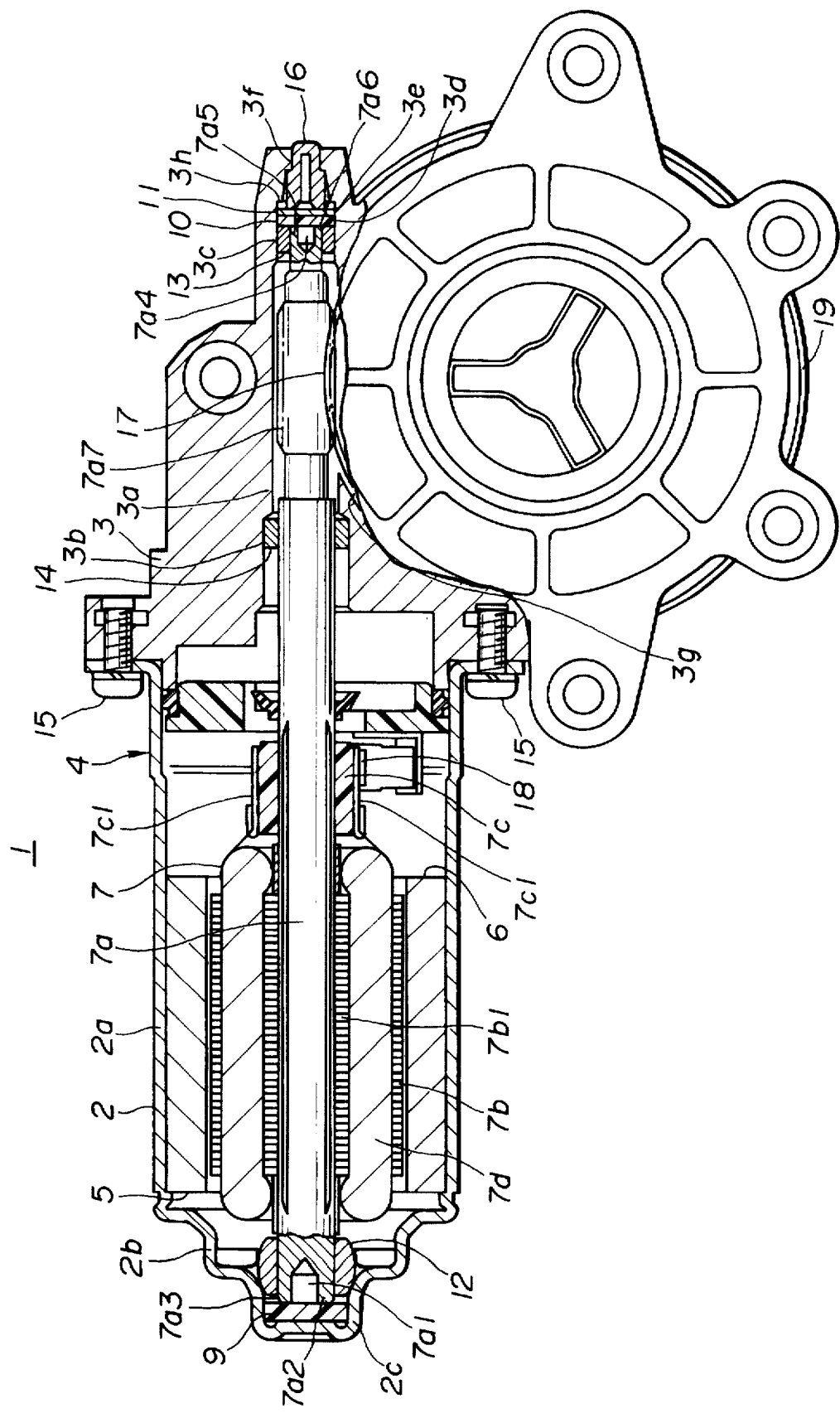
FIG. 1 is a longitudinal sectional view illustrating an embodiment of the geared electric motor according to this invention.
Figure 2:
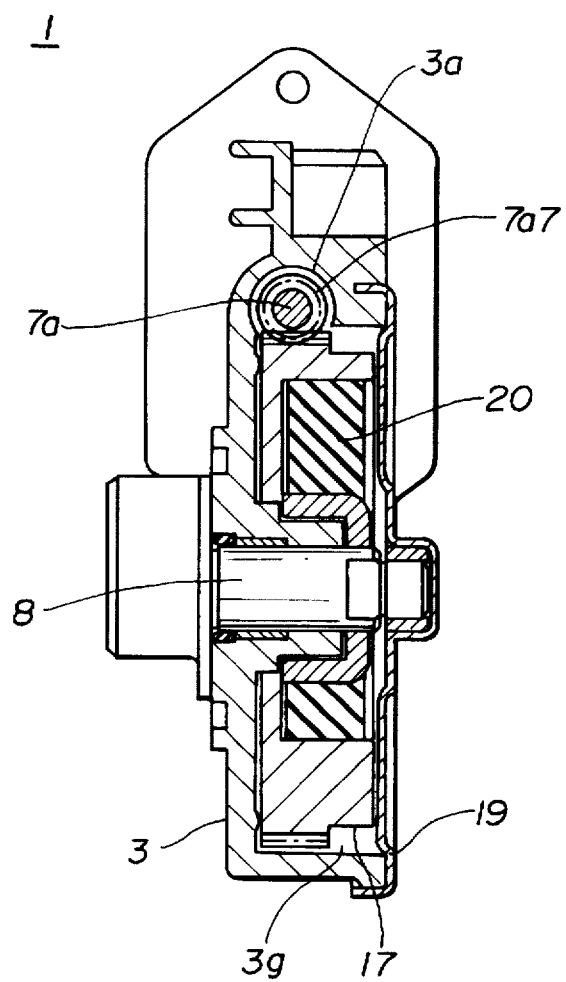
FIG. 2 is a vertical sectional view at the output shaft of the geared electric motor shown in FIG. 1.

An embodiment of the geared electric motor according to this invention will be explained below on basis of FIG. 1 to FIG. 4.

An geared electric motor 1 shown in the figures is a power window motor used for actuating window glasses of motor vehicles, and is mainly constructed from a case 4 composed of a motor housing 2 and a gear housing 3, magnets 5 and 6, an armature 7 having an armature shaft 7a, an output shaft 8, a first friction plate 9, a second friction plate 10, a backing plate 11, a first bearing 12, a second bearing 13 and a third bearing 14.

The motor housing 2 is made in one body from a cylindrical shaped housing body 2a and a housing end 2b forming bottom part thereof.

The motor housing 2 is secured with semicylindrical magnets 5, 6 on the inner face of the housing body 2a, and the both magnets 5, 6 form magnetic field in the motor housing 2.

The first bearing 12 is disposed on the inside of the housing end 2b of the motor housing 2 so as to support rotatably one end of the armature shaft 7a of the armature 7, which will be described later. Further, a plate-containing portion 2c is formed between the first bearing 12 and the bottom wall of the housing end 2b, and the first friction plate 9 is housed in the plate-containing portion 2c.

The motor housing 2 houses the armature 7 between the magnets 5 and 6, and is coupled with the gear housing 3 by screwing screw bolts 15 into the gear housing 3 at the opening side thereof.

The gear housing 3 combined with the motor housing 2 is formed with a round shaped shaft-insertion hollow 3a to be inserted with the armature shaft 7a in about the center. The shaft-insertion hollow 3a is formed so as to extend from the end on the side of motor housing 2a to the opposite end of the gear housing 3 and, a part of the armature shaft 7a extruding from the motor housing 2a is inserted in the insertion hollow 3a of the gear housing 3.

Further, the gear housing 3 is formed with a damper-fitting hole 3f communicating with the shaft-insertion hollow 3a at the end thereof, and a damper 16 is fitted into the fitting hole 3f by inserting it into the fitting hole 3f from the side of the shaft-insertion hollow 3a. The damper 16 is made of gummous material having some elasticity.

The gear housing 3 is also disposed with a second bearing 13 in the shaft-insertion hollow 3a at a bearing-fixative portion 3c near to the end thereof, the second bearing 13 supports rotatably another end of the armature shaft 7a. The gear housing 3 is further disposed with a third bearing 14 at another bearing-fixative portion 3b in the middle of the shaft-insertion hollow 3a. The third bearing 14 is disposed through a predetermined slight gap between the armature shaft 7a and this bearing 14 in consideration of deflection of the armature shaft 7a at the time when the output 8 is applied with excessive load exceeding the rated capacity of this geared motor 1. Namely, the third bearing 14 prevents the armature shaft 7a from the excessive deflection even if the armature shaft 7a is subjected to bending stress caused by the load applied on the output shaft 8 through a worm gear pair (which will be described later), therefore it is possible to prevent the worm gear pair from disengagement and breakage.

Furthermore, the gear housing 3 is provided with another plate-containing portion 3d and a backing-containing portion 3e in the shaft-insertion hollow 3a between the second bearing 13 and the damper 16, therefore a second friction plate 10 and a backing plate 11 are housed in the plate-containing portion 3d and the backing-containing portion 3e, respectively. The backing plate 11 is made of a metal and has good rigidity.

The gear housing 3 is also formed with a wheel-containing hollow 3g communicating with the shaft-insertion hollow 3a, where a worm wheel 17 is housed. The worm wheel 17 forms a part of the worm gear pair and is combined with the output shaft 8 through a damper 20 shown in FIG. 2, the output shaft 8 is supported rotatably at the gear housing 3 and extrudes outwardly from the gear housing 3. An opening of the gear housing 3 is covered with a gear cover 19.

The armature 7, which is housed in the motor housing 2, is composed of the armature shaft 7a, an armature core 7b, a commutator 7c and an armature coil 7d.

The armature shaft 7a is formed with a concavity 7a1 in the first end face on the side of one end supported rotatably by the first bearing 12.

The concavity 7a1 has a predetermined depth in the axial direction from the center of the first end face of the armature shaft 7a, and the ratio of the inner diameter of the concavity 7a1 to the outer diameter of the armature shaft 7a is selected so as to be 5:8 in this embodiment.

The armature shaft 7a is formed with a bevel edge 7a3 by cutting the peripheral edge of the first end face of the shaft 7a in a partial spherical surface, and formed with a contact face 7a2 to be in contact with a surface of the first friction plate 9 between the concavity 7a1 and the bevel edge 7a3. In this time, it is also possible to form the bevel edge 7a3 in a shape of circular cone.

The first friction plate 9 is housed in the plate-containing portion 2c as described above, and so disposed as to come in through with the first end face of the armature shaft 7a at the contact face 7a2 in a state of being in contact with the bottom wall of the housing end 2b of the motor housing 2. The friction plate 9 is formed in a disk-like shape from high polymer material such as nylon 66 obtained by condensation of hexamethylenediamin and adipic acid, for example.

The first friction plate 9 comes in touch with the first end face of the armature shaft 7a at the ring-shaped contact face 7a2 which is situated at the outer peripheral position away from the center of the first end face of the armature shaft 7a, therefore the large frictional resistance appears between the friction plate 9 and the armature shaft 7a. Additionally, the contact face 7a2 is small in the surface area as compared with the sectional area of the armature shaft 7a and the frictional resistance is further increased because the force applied on the unit area of the friction plate 9 becomes larger, thereby increasing the true contacting area of the friction plate 9 with the first end face of the armature shaft 7a.

On the other side, the armature shaft 7a is also formed with a concavity 7a4 in the second end face on the side of another end supported rotatably by the second bearing 13.

Figure 3:
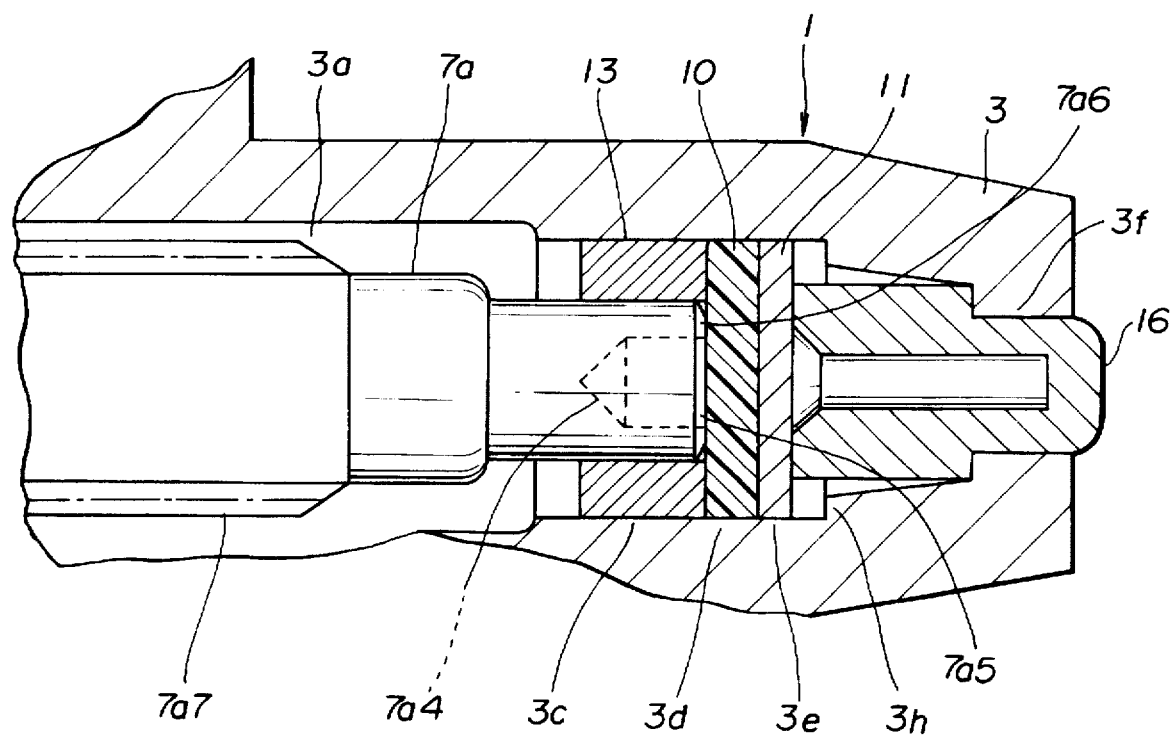
FIG. 3 is an enlarged sectional view at a potion of the friction of the geared electric motor shown in FIG. 1.
Figure 4:
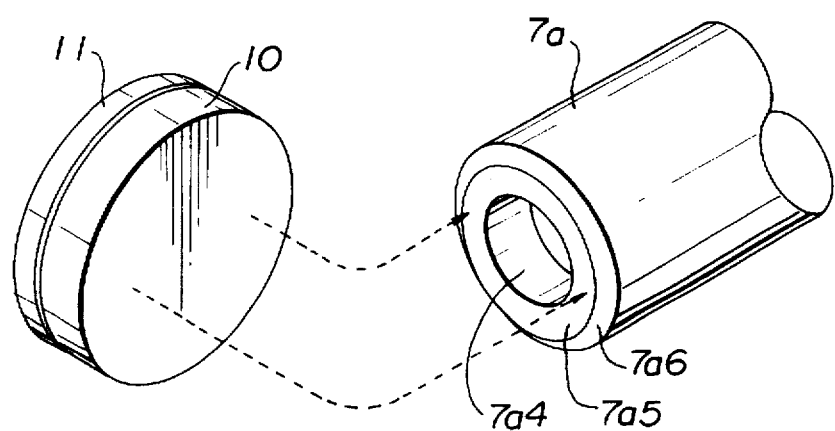
FIG. 4 is a perspective view illustrating the friction plate and the end face of the armature shaft in the geared electric motor shown in FIG. 1.

The concavity 7a4 has a predetermined depth similarly to the concavity 7a1 formed in the opposite first end face of the armature shaft 7a as also shown in FIG. 3 and FIG. 4, and the ratio of the inner diameter of the concavity 7a4 to the outer diameter of the armature shaft 7a is also selected so as to be 5:8 in this embodiment.

The armature shaft 7a is similarly formed with a bevel edge 7a6 having a partial spherical surface at the outer periphery of the second end face and formed with a contact face 7a5 to be in contact with a surface of the second friction plate 10 between the concavity 7a4 and the bevel edge 7a6. The bevel edge 7a6 may be also formed in a shaped of circular cone.

The second friction plate 10 and the backing plate 11 are housed in the plate-containing portion 3d and the backing-containing portion 3e respectively in contact with each other. The second friction plate 10 and the backing plate 11 are in contact with the second end face of the armature shaft 7a at the contact face 7a5 and the damper 16 respectively as shown in FIG. 3, and the backing plate 11 is so designed as to move in the axial direction of the armature shaft 7a together with the second friction plate 10 until a step 3h in the shaft-insertion hollow 3a according to the elasticity of the damper 16 at the time when the armature shaft 7a is applied with force in the axial direction. Namely, the damper 16 prevents the armature shaft 7a from rattling.

The second friction plate 10 is also formed in a disk-like shape from high polymer material such as nylon 66 or POM (polyacetal, polyoxymethylene) similarly to the first friction plate 9. The friction plates 9 and 10 may be formed also from, for example, metallic material, woody material or ceramic material other than high polymer material.

The second friction plate 10 comes in touch with the second end face of the armature shaft 7a at the ring-shaped contact face 7a5 which is situated at the outer peripheral position away from the center of the second end face of the armature shaft 7a and is small in the superficial area as compared with the sectional area of the armature shaft 7a similarly to the case of the first friction plate 9. Therefore, the large frictional resistance can be obtained between the frictional plate 10 and the armature shaft 7a on the same mechanism as mentioned above.

The armature shaft 7a is provided with a worm 7a7 at the middle portion between the first and the third bearings 13 and 14. The worm 7a7 is meshed with the worm wheel 17 in the gear housing 3 and forms the worm gear pair together with the worm wheel 17.

Furthermore, the armature shaft 7a is secured with the armature core 7b having a plurality of coiling sections 7d1 corresponding to the number of slots, and disposed with the commutator 7c adjacently to the armature core 7b.

The commutator 7c is provided with commutator pieces 7c1 insulated with each other of the number corresponding to that of the coiling sections 7b1 of the armature core 7b, and armature coils 7d formed around the respective coiling sections 7b1 of the armature core 7b are connected to the respective commutator pieces 7c1. Further, two brushes 18 are disposed so as to electrically contact with the commutator pieces 7c1 of the commutator 7c.

The geared electric motor 1 having the aforementioned structure is mounted in a door panel of the motor vehicle through a fixative base provided to the gear housing 3, the respective brushes 18 of the motor 1 are connected electrically with a drive circuit in the power window apparatus (not shown) and the output shaft 8 extruding from the gear housing 3 is connected mechanically with a window regulator (not shown) in the power window apparatus.

When the window switch of the power window apparatus is operated on the opening side at the time the window is closed, an electric current flows in the respective armature coils 7d in the forward rotational direction through the brushes 18, thereby rotating the armature 7 in the forward direction and the window glass is actuated in the opening direction through the window regulator.

Contrary to the above, if the window switch is operated on the closing side at the time the window is opened, the electric current flows in the armature coil 7d in the reverse direction through the brushes 18, thereby rotating the armature 7 in the reverse direction and the window glass is actuated in the closing direction through the window regulator.

Subsequently, when the window glass arrives at the full-closed position, the drive circuit in the power window apparatus detects the window glass to arrive at the full-closed position and cuts off the power supply to the brushes 18 automatically, whereby the armature 7 is stopped to stop the window glass at the full-closed position.

In this time, it is not possible to open the window even if someone tries to move the window glass in the opening direction from the outside of the motor vehicle because the armature shaft 7a of the geared electric motor 1 is maintained in this (stopped) state by the frictional resistance generating between the friction plates 9, 10 and the both end faces of the armature shaft 7a. Namely, the armature shaft 7a of the motor 1 is never rotated according to the rotatory force transmitted from the worm wheel 17 or the output shaft 8, and it is possible to prevent a burglary in the parked motor vehicle.

Figure 5A:
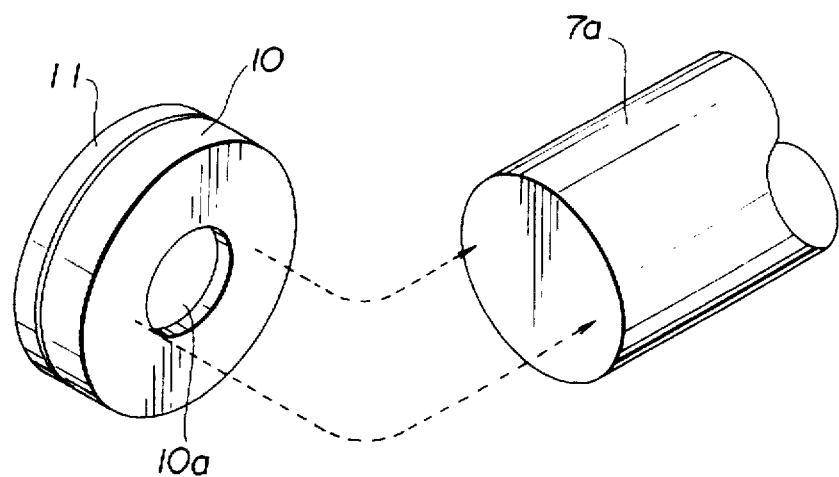
FIGS. 5A and 5B are perspective views illustrating the other examples of the friction plate.
Figure 5B:
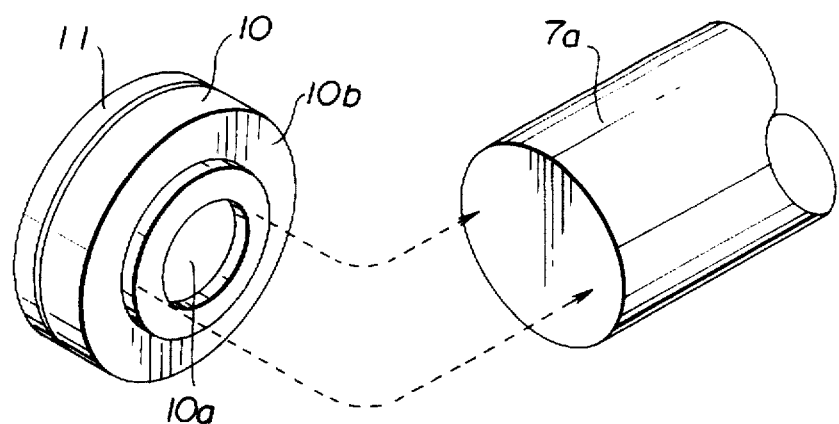

In the geared electric motor according to this invention, it is also possible to obtain the same effects as described above even if a concavity 10a and a recession 10b are formed in the surface of the friction plate 10 (naturally also in the surface of the friction plate 9) as shown in FIGS. 5A and 5B instead of the concavity 7a4 and the bevel edge 7a6 formed in the end face of the armature shaft 7a.

As mentioned above, the geared electric motor according to this invention is provided with a friction plate to be in contact with an end face of the armature shaft. Therefore, the armature shaft of the motor is prevented from the irregular rotation caused by the rotary force applied on the output shaft of this motor by frictional resistance generating between the friction plate and the end face of the armature shaft, and an excellent effect can be obtained in that it is possible to prevent a burglary in the parked motor vehicle by applying the geared motor according to this invention to the power window apparatus or the power roof system of the motor vehicle, for example.

In the geared electric motor of which armature shaft is formed with a concavity or the concavity and a bevel edge at the end face of the armature shaft as one of embodiments according to this invention, it is possible to increase the frictional resistance generating between the frictional plate and the armature shaft because of increase the true contacting area there between. Also in the geared electric motor of which friction plate is formed with a concavity or the concavity and a recession on its contacting surface as one of the other embodiment according to this invention, it is possible to obtain the same effects as described above for the reason similar to the above.

In the geared electric motor according to another embodiment of this invention of which friction plate is disposed in the case together with a backing plate, it is possible to reinforce the friction plate and an excellent effect can be obtained since material for the friction plate can be selected from a wider range.

In the geared electric motor according to the other embodiment of this invention of which armature shaft is supported rotatably by two bearings at the both ends, the armature can be supported very stably. Further, in the geared electric motor according to the other embodiment of this invention, the armature shaft is further supported through a third bearing at the middle portion between the both ends, therefore the armature shaft can be prevented from the excessive deflection by the third bearing and an excellent effect can be obtained since it is possible prevent the worm gear pair from breakage.

What is claimed is:

1. A geared electric motor comprising:

a case comprised of a motor housing provided with a pair of magnets secured on an inner peripheral surface thereof and a gear housing in which a worm wheel with an output shaft is disposed;

first and second bearings, said first bearing being supported in said motor housing and said second bearing being supported in said gear housing;

an armature disposed radially inwardly of the pair of magnets and including an armature shaft rotatably supported at opposite ends by said first and second bearings, said armature shaft being provided with a worm gear disposed in meshing engagement with said worm wheel in said gear housing and being formed with a concavity having a predetermined depth in an end face and being formed with a ring shaped end face about said concavity adjacent said second bearing;

a friction plate disposed between said gear housing and the ring shaped end face of said armature shaft for applying friction force to said armature shaft, said friction plate having a backing plate made of metal disposed between said friction plate and said gear case;

said end face of said armature shaft of the armature being further provided with a bevel edge out of contact with said friction plate at an outer periphery of the end face and surrounding said ring shaped end face; and a damper member made of elastic material disposed between said backing plate and said gear housing.

* * * * *